United States Patent

Aiken

[15] 3,657,476

[45] Apr. 18, 1972

[54] CRYPTOGRAPHY

[72] Inventor: Howard H. Aiken, 1511 South Ocean Drive, Fort Lauderdale, Fla. 33316

[22] Filed: Jan. 23, 1970

[21] Appl. No.: 5,307

[52] U.S. Cl. ....... 178/22, 331/78

[51] Int. Cl. ....... H04l 9/04

[58] Field of Search ....... 178/22

[56] References Cited

OTHER PUBLICATIONS

Savage, Some Simple Self-Synchronizing Digital Data Scramblers, Bell Sys. Tech. J., February, 1967, pp. 449–487.

*Primary Examiner*—Rodney D. Bennett, Jr.
*Assistant Examiner*—Daniel C. Kaufman
*Attorney*—Lane, Aitken, Dunner and Ziems

[57] ABSTRACT

The cryptographic system to be described is based on a unique number theoretical approach to the generation of pseudo-random digits derived from the $$N = (m-1)m^{n-1}$$

distinct powers of $r$ modulo M where $$M = m^n,$$

$m$ is a prime, and $r$ is a properly chosen primitive root of $m$. The digits of the powers of $r$ are transformed into Boolean vectors, and these in turn are used as arguments of a Boolean function employed to generate pseudo-random digits. Subsequently, the pseudo-random digits are combined with digits representing the data to be encoded in a manner facilitating the decoding. Security is provided by the very great periodicy that the invention provides. Known electrical components are arranged in a manner to provide solid state circuitry for the implementation of the cryptographic method.

21 Claims, 3 Drawing Figures

INVENTOR
HOWARD H. AIKEN

BY Lane, Aitken, Dunner & Ziems
Attorneys

CRYPTOGRAPHY

BACKGROUND OF THE INVENTION

1. Field of the Invention

This invention relates to the field of cryptography and particularly to the generation of pseudo-random digits of very great periodicy for use in a cryptographic system.

2. Description of the Prior Art

In the prior art, electromechanical devices have been employed for the generation of a series of digits to be employed in the cryptographic treatment of messages in preparation for transmission. The speed and range of such devices are necessarily limited by their mechanical character. Further they are noisy and subject to the undesirable radiation of electromagnetic signals.

The present day cryptographic machines are intended primarily to meet the needs of the military and the affairs of state. Such machines are too large and expensive to even be considered for application in common data processing operations.

Automatic computers, especially those interconnected by communication networks, have the power to be of inestimable value in the affairs of government, industry, and commerce; indeed data processing systems have become so vast and so complicated that present day operations could hardly exist in the absence of information processing machines. This statement is especially true when applied to the manipulation of the huge data banks often stored in memory systems of computer networks. Such data banks, when properly used, yield important summaries and conclusions necessary in day to day operations and in governmental, industrial, and corporate planning. Their value has also been demonstated in the political, social and medical sciences through the application of statistical sampling and other mathematical techniques.

On the other hand, the very existence of large data banks and the power to draw conclusions from them is often deplored by representatives of government and the academic community as well as others concerned with public welfare. Misapplication of great data systems can lead to results harmful to the state and to the individual whose complete record and personal characteristics are set forth in such files, e.g., the Bureau of the Census, the Internal Revenue Service, and other government agencies. But the Government is not alone in information gathering and storing activities; corporations maintain detailed files on the characteristics of their customers; credit bureaus are prepared to supply credit and other risk information on individuals residing in the area served on a momentary basis. These are in addition to a host of other state, municipal, and private agencies engaged in a great variety of information processing activities intended to minimize the cost of direct by mail advertising, to aid the police in the capture of felons, and to assist in the distribution of welfare funds, for example.

Especially when central computing facilities are wire connected to the diverse and often competing activities which they serve, improper switching operations, either accidental or deliberate, stand as a threat to the integrity of proprietary information. The misuse of private and personal information, and the fear that "big brother is watching you" must be minimized by proper definition of the responsibilities of those engaged in the data processing business. If the misuse of this information is not minimized or eliminated, the public will demand laws to do so. Such legislation can help to protect the public and the individual from acts resulting from the misuse of information, especially by persons within the walls of computer establishments. However, switching errors which result in the delivery of information to improper recipients, and accidental and deliberate wire tapping operations, can still result in serious invasions of privacy of an individual.

At present there is no known cryptographic system which is simple and inexpensive enough to be useful in data processing systems although there is a critical need for such security. Consider, for example, computer programs. Although computer programs can be copyrighted, under certain circumstances, and the U.S. Patent Office is considering applications to patent computer programs, the area of protection is not certain. Most proprietors of computer programs attempt to rely on the law of unfair competition (trade secrets and confidential relationships) to protect their proprietary programs. This type of protection is ethereal and while most consider it the best presently available, is not completely satisfactory for obvious reasons. On the other hand, if computer programs could be sufficiently encrypted so that they could not be decoded except by the proprietor's small device added to his customers' machine, a unique way would be found of keeping a computer program truly a secret.

SUMMARY OF THIS INVENTION

This invention provides a unique and low cost method of generating a string of pseudo-random digits of great periodicy which can be combined with message digits to provide an extremely secure cryptographic system. The cryptographic system is secure even to one who knows how the system works and can only be decoded by one who has the "key" number. Means for changing the key at will are incorporated in the circuitry employed to implement this invention.

The pseudo-random digits used in this cryptographic system are derived from the $N = (m-1)m^{n-1}$ distinct powers of $r$ modulo M where $M = m^n$ and $r$ is a primitive root of $m$, a prime. The pseudo-random digits are obtained as follows:

a. First generate the powers of $r$ modulo M by the recurrance relationship $$|r^{p+1}|_M = |r r^p|_M$$

b. then transfer the digits of $|r^p|_M$ into a Boolean vector by means of the transformation $$T(d) = \delta_0, \delta_1, \ldots \delta_{m-1}$$

where the δ's are all 0 or 1 and $d$ is a digit in the radix $m$ number system. In all, $2^m$ such transformations exist.

c. then partition the Boolean vectors $$000 \ldots 0 \text{ to } 111 \ldots 11$$

into two partitions having total equal counts as the powers of $r$ are generated in the interval $$0 \leq p < N$$

d. Use the Boolean vector corresponding to $|r^p|_M$ as input to a Boolean function, $f(p)$, defined by the partitions described in (c). The total equal counts there indicated will ensure that the digits generated by the Boolean function will take on the values 0 and 1 substantially an equal number of times in the interval $0 \leq p < N$.

e. Combine the digits $f(p)$ generated by the Boolean function with the digits of the message to be encoded or decoded.

Figures 1, 2:
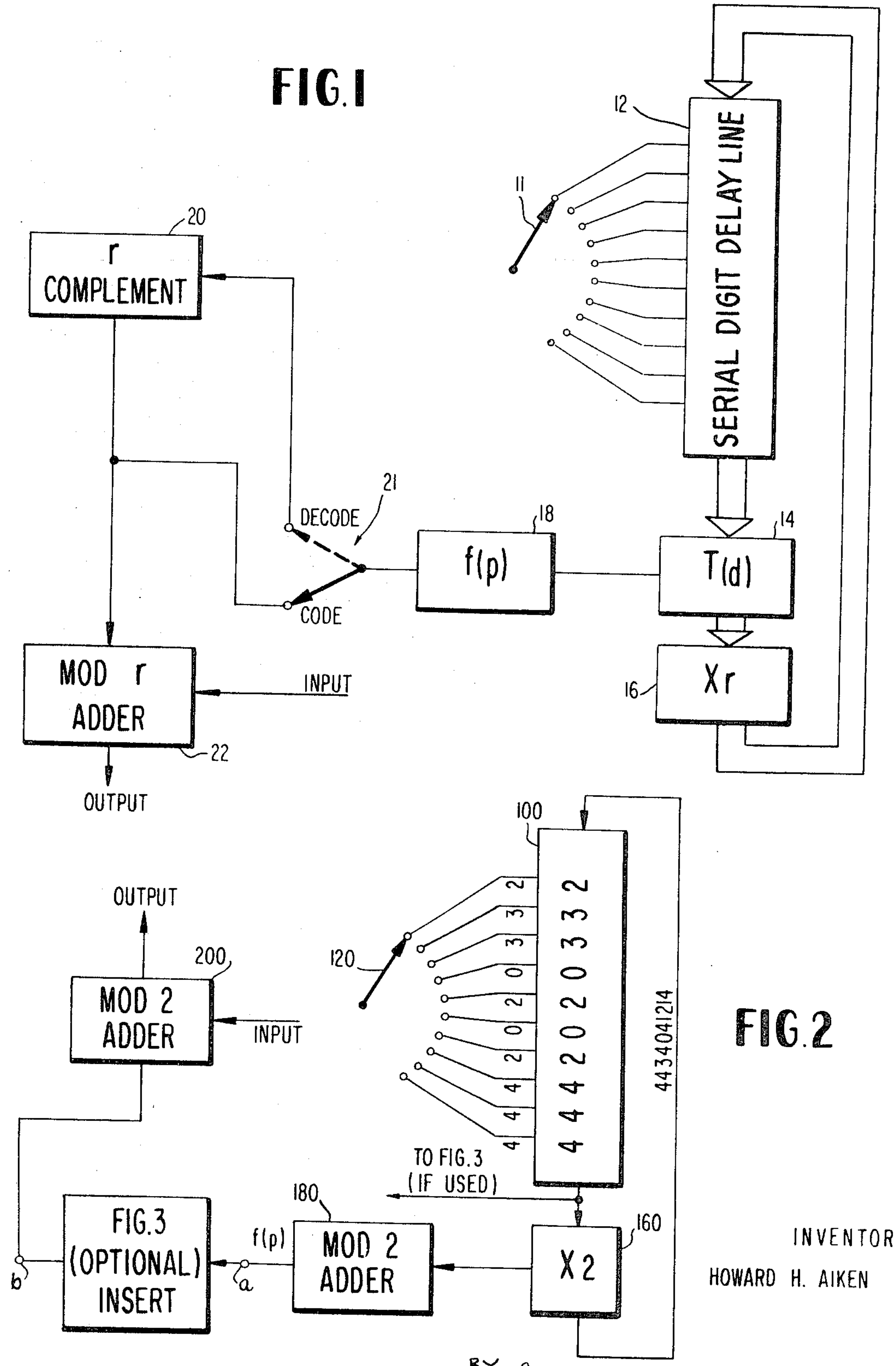
FIG. 1 is a schematic block diagram view of a cryptographic apparatus of this invention in a generalized sense.
FIG. 2 is a block diagram of the cryptographic apparatus of this invention where $r=2$, $m=5$.

For purposes of brevity and clarity, pulse generators, gates, start-stop circuits, end of number controls, and the like all being well known in the computer art have been omitted from the drawings.

DETAILED DESCRIPTION OF THE INVENTION

Because of the mathematical character of this invention, it is necessary to understand the number theory on which it is based in order to obtain a clear understanding of the invention itself.

Consider first the powers of primative roots.

If $m$ is a prime, and $r$ is a primative root of $m$, then by definition, there are $m-1$ distinct powers of $r$ modulo $m$ and furthermore $$|r^{m-1}|_m = 1, \qquad 1.$$

Then let $$M = m^n, \qquad 2.$$

and let N be the number of distinct powers of $r$ modulo M. There exist small primes such that the number of distinct powers of $|r^p|_M$ is, $$N = (m-1)m^{n-1} \quad 3.$$

In order to establish the validity of (3) for a given $r$ and $m$ it is only necessary to show that $$N = (m-1)m,$$

when $$M = m^2. \quad 4.$$

In the following description of the invention, it will be assumed that $r$ and $m$ have been properly chosen so that (3) and (4) apply.

Now note that in radix $m$ notation, $m^n$ integers can be expressed in terms of $n$ digits, but of those $$N = m^n(m-1)/m = (m-1)m^{n-1} \quad 5.$$

have a non-zero lowest order digit. Hence, the following:

Theorem: If $r$ is a properly chosen primitive root of $m$, every $n$ digit integer in radix $m$ notation, having non-zero lowest order digit is an integral power of $r$ modulo M. By "properly chosen" is meant that $N=(m-1)m^{n-1}$.

Hence, let $$z_p = |r^p|_M \quad 6.$$

be any integer as proscribed by the theorem chosen at will. Then the recurrence relationship, $$z_{p+1} = |rz_p|_M = |r^{p+1}|_M \quad 7.$$

suffices to generate all N powers of $r$ in sucession since the process of reduction modulo M after multiplication is provided by carry overflow.

Next let $$d = 0, 1, 2, \ldots m-1$$

be a radix-$m$ digit, and let $$T(d) = \delta_0, \delta_1, \delta_2, \ldots \delta_{m-1} \quad 8.$$

be a binary transformation. If the digits of $z_p$ are $d_{pq}$ with $$0 \leq q < n,$$

and $$0 \leq p < N,$$

then the transformation (8) transforms $z_p$ into a Boolean vector, $$I_p = \delta_{p\ n-1}, \delta_{p\ n-2}, \ldots \delta_{p1}, \delta_{p0}$$

In all $2^m$, such transformations exist. There is however no loss in generality if T($d$) is restricted so that $$\delta_0 = 0$$

Moreover, the transformation $$T(d) = 0, 0 \ldots 0$$

and $$T(d) = 0, 1, \ldots 1$$

need no consideration since the first reduces all vectors $I_p$ to $$I_p = 0, 0, \ldots 0,$$

and the second restricts all of the $I_p$ so that they have unity as lowest order digit $\delta_{p0}$.

Then $2^{m-1}-2$ transformations remain to be considered. These have the property that all $2^n$ possible Boolean vectors will be generated as $z_p$ takes on all values in the interval, $$0 \leq p < N \quad 9.$$

To see this, let the transformation (8) have $a$ zero elements and $b$ unit elements such that $$a + b = m,$$

and consider a vector $I_p$ having $\mu$ zero elements $\nu$ unit elements so that $$\mu + \nu = n.$$

First let $\delta_{p0} = 0$; then the frequency of occurrence of $I_p$ is, $$\varphi = a\mu - 1_b\delta(a-1). \quad (10a)$$

But, when $\delta_{p0} = 1$, $$\varphi = a\mu b\delta. \quad (10b)$$

Because of the restrictions placed on T($d$), neither of the foregoing expressions can give $\Phi$=0 for any values of $\mu$ and $\nu$; hence all Boolean vectors are provided by the $z_p$ in the interval (9).

Consider now the theory relating to digit generation. If $a$ and $b$ are restricted so that, $$a = b+1, \quad 11.$$

reference to (10$a$) and (10$b$) shows that two Boolean vectors differing only in the element $\delta_{p0}$ have the same frequency of occurrence $\Phi$. Accordingly, the vectors $I_p$ can always be partitioned into two subsets such that each subset includes $2^{n-1}$ vectors, and moreover, so that the two subsets have an equal number of vector occurrences, entoto. Hence, the two subsets may be used to define a Boolean function, and its inverse, capable of generating a sequence of binary digits $f(p)$ having period N as $z_p$ takes on all values in the interval (9). Moreover, the number of zero elements and unit elements in this sequence will be equal, thus providing one of the prerequisites that $f(p)$ must meet in order to qualify as a pseudo-random sequence.

Even after the restrictions (8) and (11) are applied, there are $$C_{(m-1)/2}^{m-1}$$

distinct transformations, T($d$). Moreover, the number of ways the vectors $I_p$ can be partitioned while maintaining equal numbers of total vector occurrences in the two partitions is enormous inasmuch as the value of $\Phi$ is determined only by the number of unit elements in a vector.

Among all of these possibilities there exists one that has especially pleasing properties. Let $r = 2$ and let the transformation be defined as $$T(d) = \left[\frac{2d}{M}\right] \quad (12)$$

That is, the definition of T($d$) is identical with that of the carry digits arising in multiplication by 2. Since these must be provided in order to generate the $z_p$ when $r = 2$, no special procedures are required by (12), per se.

Next, let the $I_p$ be partitioned in accordance with the following scheme:

| | |
|---|---|
| 0..0000 | **0..0001** |
| 0..0011 | **0..0010** |
| 0..0101 | **0..0100** |
| 0..0110 | **0..0111** |
| 0..1001 | **0..1000** |
| 0..1010 | **0..1011** |
| 0..1100 | **0..1101** |
| 0..1111 | **0..1110** |
| .... | .... |

That is all vectors having an even number of unit digits are put in one subset and those having an odd number of digits are put in the other. Hence, $f(p)$ can be evaluated by the expression:

$$f(p) = \left| \sum_{q=0}^{n-1} \left[\frac{2dpq}{m}\right] \right|_2 \quad (13)$$

The foregoing procedures can be extended to some other radices. Let $m$ and $r$ be related by $$(m-1)/r = \text{an integer}. \quad 14.$$

This insures that the carry digits arising from the multiplication of $dp0$ by $r$ take on each of the values $$0, 1, 2, \ldots r-1 \quad 15.$$

an equal number of times. Hence, $$f(p) = \left| \sum_{q=0}^{n-1} \left[\frac{rd_{pq}}{m}\right] \right|_{r'} \quad (16)$$

represents a sequence of digits of radix $r$ such that each of (15) occurs an equal number of times in the period N. An example is provided by $m$=7, $r$=3; and, $$(m-1)/r = 2.$$

Since $m$ is odd, $r = 2$ always satisfies the conditions of (14) but this is not true in general. For example, there is no small prime, $m$, that meets this restriction when $r = 10$.

Consider now character sets, including the character sets which are in common use for the representation of numerical and other information. Of these, the three most important are the alphabet, the 10 decimal digits, and a set of 256 "characters," each of which is composed of one of the combinations of the values of eight binary digits used in data processing machines. Since the letters of the alphabet are usually represented by 26 of the 256 characters just described, the alphabet requires special treatment only when the information being processed or transmitted consists primarily of words. It is then of interest to give the letters of the alphabet numerical significance in order to simplify the cryptographic process.

This is most easily done by prefixing the letters of the alphabet with some symbol, say *, to form the ordered set,

*A B C . . . X Y Z.

Then if the asterisk is given the meaning, $$* = 0,$$

the 27 symbols (17) may be taken as the integers of a number system of radix 27. Thereafter, every word becomes a number, and hence, can be manipulated by arithmetic or other rules as in the case of the decimal digits and of the eight digit characters employed in data processing machines.

The addition and multiplication tables of radix 27 arithmetic have, $$(27)^2 = 729,$$

entries. Since this number is inconveniently large, it is useful to represent each letter of the alphabet by three ternary digits in accordance with the scheme exhibited in Table I.

TABLE I

| | | | | | |
|---|---|---|---|---|---|
| * | 000 | I | 100 | R | 200 |
| A | 001 | J | 101 | S | 201 |
| B | 002 | K | 102 | T | 202 |
| C | 010 | L | 110 | U | 210 |
| D | 011 | M | 111 | V | 211 |
| E | 012 | N | 112 | W | 212 |
| F | 020 | O | 120 | X | 220 |
| G | 021 | P | 121 | Y | 221 |
| H | 022 | Q | 122 | Z | 222 |

As is well known, numbers represented in a number system of radix $m$ may be translated to the equivalent values in the number system of radix M when, $$M = m^n,$$

by the simple process of pointing off the radix $m$ digits into groups of $n$, and translating each group of digits into a single digit of radix M.

The reverse process consists of replacing each radix M digit by its equivalent in the radix $m$ number system. These devices are available when dealing with the letters of the alphabet inasmuch as, $$27 = (3)^3;$$

hence all arithmetic operations on letters of the alphabet are best carried out in radix 3 arithmetic for which the addition and multiplication tables are exhibited in the following tabulations:

Table II

| + | 0 | 1 | 2 |
|---|---|---|---|
| 0 | 0 | 1 | 2 |
| 1 | 1 | 2 | 10 |
| 2 | 2 | 10 | 11 |

Addition

| × | 0 | 1 | 2 |
|---|---|---|---|
| 0 | 0 | 0 | 0 |
| 1 | 0 | 1 | 2 |
| 2 | 0 | 2 | 11 |

Multiplication

As an example of radix 27 addition consider:

```
USAF+FTD   =   210201001020
           +      020202011
           =   210221210101
           =   UYUJ
```

this can be verified by reference to the above tables.

An example of radix 27 multiplication is:

```
WE · US    = 212012 · 210201;
           = 200122012112;
           = RQEN;
```

this result may be verified by ordinary multiplication in radix 3 arithmetic.

Once the arithmetic nature of information has been recognized, it should be clear that any suitable mathematical function may be used as the basis of the cryptographic system. However, practical considerations dictate that:

a. The encoding process should not greatly increase the message length;

b. Characters should be encoded as individuals. Otherwise a transmission error could render all that part of a message following an error as unintelligible to the recipient even when provided with the appropriate cryptographic key.

Accordingly, most cryptographic systems are based on character by character combinations of the symbols of the message with those in a series of pseudo-random digits provided by a digit generator.

For example, let it be required to encode a clear message, C, with the digits, R, and let the encoded message ready for transmission be called T. Further, let the $i^{th}$ digits of C, R, and T be designated as $C_i$, $R_i$, and $T_i$, respectively, where $$i = 1, 2, 3, \ldots.$$

Then the encoding process can be accomplished by the function $$T_i = f(C_i, R_i)$$

provided $f(C_i, R_i)$ has the following properties:

1. The function must be single valued;
2. It must have a single valued inverse:

$$C_i = f^{-1}(T_i, R_i)$$

3. The frequencies of the several symbols in T should be nearly uniform so as to provide no clues to a cryptographer attempting to break the system;
4. The evaluation of the function and of its inverse should require only simple rules so as not to increase the cost and complexity of the cryptographic equipment.

A great many functions exist all of which satisfy the foregoing conditions. However, there is one having especially pleasing properties when viewed in connection with the design of cryptographic machines as a whole. This statement will be increasingly clear in consideration of the following; Assume the digits T are defined by, $$T_i = |\, C_i + R_i \,|_r \qquad 18.$$

read, "the sum of $C_i$ and $R_i$ modulo $r$," where $r$ is the radix of the number system in which $C_i$, $R_i$, and $T_i$ are expressed. The above expression (18) may be solved for $C_i$ so that $$C_i = |\, T_i + \bar{R}_i \,|_r \qquad 19.$$

where $\bar{R}_i$ is the $m$ complement of $R_i$; that is, when, $$R_i = 0, 1, 2, \ldots r-2, r-1,$$

then $$\bar{R}_i = 0, r-1, r-2, \ldots 2, 1,$$

As previously stated, any mathematical function meeting the conditions here stated may be used as the basis of a cryptographic system. However, formulas (18) and (19) will be taken as the defining equations for encoding and decoding procedures adopted.

EXAMPLE 1

Let

C = THE FLEET . . . ,
  = 2020220120201100120l2202 for which $m = 3$. Further, let

R = 2000111121201220222220112.

then,

T = 1020001211102020012020l1,
  = K*PLTATD.

But, $\bar{R}$ = 1000222212102110111110221;

so that the clear message may be recovered by the application of (19) as can be seen.

EXAMPLE 2

Let

C = 10110111 00101001 . . .

for which $m = 2$. Then if

R = 11000100 11010100 . . .

(18) gives

T = 01110011 11111101 . . .

In modulo 2 arithmetic, R and $\bar{R}$ are identical; hence C may be recovered by a second addition of R, modulo 2. This pleasing relationship simplifies the cryptographic equipment needed when operating in a system where $r = 2$.

In most practical cryptographic applications, the digits R are generated by a device making use of some predictive rule. Since all such devices are finite, they operate periodically; that is after cycling through N digits they repeat the sequence again and again. However, no two messages in close proximity should be encoded with the same digits R. Such practice would inevitably provide clues to an analyst attempting to read the encoded messages, and thus break the system. This can only be accomplished by making the period of the digit generator very great. With this invention, it is practical to choose the design parameters in order that the period of the generator is so great that it would not be repeated in a thousand years by a machine generating digits at 1,000 megacycles.

Consider now the following possible systems. In the first Example, consider the possibility of a system for the generation of radix 2 digits (a binary system). Since 2 is a primitive root of $m = 3$, and $$(m-1)/r = (3-1)/2 = 1,$$

then, $$N = 2 \cdot 3^{n-1},$$

and $$f(p) = \left| \sum_{q=0}^{n-1} \left[ \frac{2dpq}{3} \right] \right|_2$$

This scheme has the advantage of extremely simple arithmetic and the disadvantage of relatively large $n$ for a given N.

As a second example, consider, $$(m-1)/r = (5-1)/2 = 2$$

and $|2^p|_5 = 1, 2, 4, 3$, when $p = 0, 1, 2, 3$, so that $m = 5$ can also be used to devise a system for the generation of digits of radix 2. On the other hand, $$|2^p|_7 = 1, 2, 4, \text{ when } p = 0, 1, 2$$

That is, 2 is not a primitive root of 7. Hence $m = 7$ is not permissible.

Another example is provided in the case of $m = 37$; $r = 18$ for which it may be shown by computation that $$|18^{36}|_{1369} = |18^{36}|_{37}.$$

Hence $m = 37$ and $r = 18$ do not satisfy the requirement that $$N = (m-1)m^{n-1}.$$

Consider another example. Let $m = 7$ and $r = 3$. Since, $$|3^p|_7 = 1, 3, 2, 6, 4, 5, \text{ when } p = 0,1,2,3,4,5$$

and $$(m-1)/r = (7-1)/3 = 2,$$

these parameters are satisfactory for the generation of ternary digits to be used in encoding the letters of the alphabet.

As another example, there exists no small prime having 4 as a primitive root. But $4 = 2^2$; hence a sequence of radix 4 digits is most easily obtained by taking radix 2 digits in pairs. A similar remark applies to radix 8 digits; these may be obtained by taking radix 2 digits in threes. Again radix 9 digits are most easily provided by taking radix 3 digits in pairs. Such simple devices are applicable in the case of other radices including 10.

To show that the cryptography of this system is more than adequate to meet all the needs of cryptographic practice, assume that a cryptographic machine is capable of generating 1,000 megadigits per second and the period of the machine is so great that 1,000 years would be required to complete a single cycle. Then, if $m=7$, it follows that $N = 6 \cdot 7^{n-1} = 1{,}000 \cdot 365 \cdot 86{,}400 \cdot 10^9$ from which $n = 23$ approximately.

The cryptographic system of this invention, as has been described, utilizes pseudo-random digits to encode and decode data and provides for pseudo-random number generation of great periodicy by first generating the powers of $r$ modulo M where $M = m^n$, $m$ is a prime number, $r$ is a primitive root of $m$, and $r$ is chosen such that $N = (m-1)\, m^{n-1}$, then transforming digits of the powers into Boolean vectors, entering the Boolean vectors into a Boolean function to generate pseudo-random digits.

Apparatus for accomplishing this is shown in FIG. 1 having a manual switch 11 or other means for introducing into a radix $m$ multichannel serial delay line 12 an initial value of $$z_p = |r^p|_M.$$

This initial value functions as the cryptographic key. The delay line is connected to and through a transformation means 14 to a times $r$ multiplier 16. The output of the multiplier is returned to the delay line for recirculation after execution of the recurrance relationship, $$z_{p+1} = |r\, z^p|_M = |r^{p+1}|_M.$$

From the transformation means 14 the transforms of the digits of $z_p$ are taken to the circuit 18 where the pseudo-random digits $f(p)$ are generated. The digits $f(p)$ are then successively delivered to the encoding-decoding circuit 22 through the manually operated "code-decode" switch 21 where they are serially added to the digits of the clear message at the "input" to provide the encrypted message at the "output." When the manually operated "code-decode" switch is in the decode position, the digits $f(p)$ pass through the $r$-complement circuit 20 in which case an encoded message at the input is decoded at the output.

Consider next a specific example, the case of $r = 2$, $m = 5$, and $n = 10$ for which $$N = 4 \cdot 5^9;$$
$$= 7{,}812{,}500.$$

Let $$T(d) = 0,0,0,1,1,$$

where $$d = 0,1,2,3,4;$$

and take $|2^{p0}|_M = 4442020332$ (the cryptographic key chosen arbitrarily)

in the number system of radix 5. Then if $$p = p_0 + h$$

Table III gives $f(p)$ in the interval $$0 \leq h < 480.$$

The column headed "$k$" in the Table is the count of the carry digits or the 3 and 4 digits in $|2^p|_M$ for which $\delta_{pq} = 1$, hence $$f(p) = |k|_2$$

FIG. 2 shows a system designed to operate in accordance with the foregoing discussion. Referring to the Figure, the serial delay line 100 is provided with a switch 120 for introducing the cryptographic key or initial value known to both the coder and the decoder. Thus,

4442020332 is the arbitrarily chosen value to be used for purposes of illustration.

After this has been multiplied by 2 in radix 5 notation by the times 2 circuit 160, the product,

4434041214 as shown in line 1, column $h$ of Table III is returned to the delay line. During the formation of this product, the carry digits generated were

1110000110.

Of these carry digits five were ones as indicated in the right hand column K of the Table. These carry digits were added modulo 2 by the adder 180 as the multiplication by 2 was in process thus forming the value of $f(p)$ given in line 0 of the Table. The output of the mod 2 adder 180 is delivered to the mod 2 adder 200 for combination with the message delivered at the input. Since the 2-complement of a binary digit is equal to itself, no manual adjustment is needed to pass from the coding to the decoding mode.

Table III

| h | $2^{P}_{M}$ | f(p) | K |
|---|---|---|---|
| 0 | 4442020332 | 1 | 5 |
| 1 | 4434041214 | 0 | 6 |
| 2 | 4423132433 | 1 | 7 |
| 3 | 4401320421 | 0 | 4 |
| 4 | 4303141342 | 0 | 6 |
| 5 | 4111333234 | 0 | 6 |
| 6 | 3223222023 | 1 | 3 |
| 7 | 2001444101 | 1 | 3 |
| 8 | 4003443202 | 1 | 5 |
| 9 | 3012441404 | 1 | 5 |
| 10 | 1030433313 | 0 | 6 |
| 11 | 2111422131 | 0 | 2 |
| 12 | 4223344312 | 0 | 6 |
| 13 | 4002244124 | 0 | 4 |
| 14 | 3010043303 | 1 | 5 |
| 15 | 1020142111 | 1 | 1 |
| 16 | 2040334222 | 0 | 4 |
| 17 | 4131223444 | 0 | 6 |
| 18 | 3313002443 | 0 | 6 |
| 19 | 2131010441 | 1 | 3 |
| 20 | 4312021432 | 0 | 4 |
| 21 | 4124043414 | 0 | 6 |
| 22 | 3303142333 | 1 | 7 |
| 23 | 2111340221 | 0 | 2 |
| 24 | 4223230442 | 1 | 5 |
| 25 | 4002011434 | 0 | 4 |
| 26 | 3004023423 | 1 | 5 |
| 27 | 1013102401 | 0 | 2 |
| 28 | 2031210302 | 0 | 2 |
| 29 | 4112421104 | 1 | 3 |
| 30 | 3230342213 | 1 | 5 |
| 31 | 2011234431 | 0 | 4 |
| 32 | 4023024412 | 0 | 4 |
| 33 | 3101104324 | 0 | 4 |
| 34 | 1202214203 | 0 | 2 |
| 35 | 2404433411 | 0 | 6 |
| 36 | 0314422322 | 0 | 4 |
| 37 | 1134400144 | 1 | 5 |
| 38 | 2324300343 | 0 | 6 |
| 39 | 0204101241 | 0 | 2 |
| 40 | 0413203032 | 0 | 4 |
| 41 | 1331411114 | 0 | 4 |
| 42 | 3213322233 | 1 | 5 |
| 43 | 1433200021 | 0 | 2 |
| 44 | 3414400042 | 1 | 5 |
| 45 | 2334300134 | 0 | 6 |
| 46 | 0224100323 | 1 | 3 |
| 47 | 1002201201 | 1 | 1 |
| 48 | 2011402402 | 0 | 2 |
| 49 | 4023310304 | 1 | 5 |
| 50 | 3102121113 | 0 | 2 |
| 51 | 1204242231 | 1 | 3 |
| 52 | 2414040012 | 1 | 3 |
| 53 | 0333130024 | 1 | 5 |
| 54 | 1221310103 | 0 | 2 |
| 55 | 2443120211 | 1 | 3 |
| 56 | 0441240422 | 0 | 4 |
| 57 | 1433031344 | 1 | 7 |
| 58 | 3431113243 | 1 | 5 |
| 59 | 2342232041 | 0 | 4 |
| 60 | 0240014132 | 1 | 3 |
| 61 | 1030033314 | 1 | 5 |
| 62 | 2110122133 | 0 | 2 |
| 63 | 4220244321 | 0 | 4 |
| 64 | 3441044143 | 0 | 6 |
| 65 | 2432143334 | 1 | 7 |
| 66 | 0414342223 | 1 | 5 |
| 67 | 134240001 | 0 | 4 |
| 68 | 3224030002 | 1 | 3 |
| 69 | 2003110004 | 0 | 2 |
| 70 | 4011220013 | 0 | 2 |
| 71 | 3022440031 | 0 | 4 |
| 72 | 1100430112 | 0 | 2 |
| 73 | 2201410224 | 0 | 2 |
| 74 | 4403321003 | 1 | 5 |
| 75 | 4312142011 | 1 | 3 |
| 76 | 4124334022 | 1 | 5 |
| 77 | 3304223024 | 0 | 6 |
| 78 | 2114001143 | 1 | 3 |
| 79 | 4233002341 | 1 | 5 |
| 80 | 4021010232 | 0 | 2 |
| 81 | 3042021014 | 1 | 3 |
| 82 | 1134042033 | 1 | 5 |
| 83 | 2323134121 | 0 | 4 |
| 84 | 0201323242 | 1 | 3 |
| 85 | 0403202034 | 0 | 4 |
| 86 | 1311404123 | 0 | 4 |
| 87 | 3123313301 | 1 | 5 |
| 88 | 1302132102 | 0 | 2 |
| 89 | 3104314204 | 1 | 5 |
| 90 | 1214133413 | 1 | 5 |
| 91 | 2433322331 | 0 | 6 |
| 92 | 0422200212 | 1 | 1 |
| 93 | 1344400424 | 0 | 6 |
| 94 | 3244301403 | 0 | 6 |
| 95 | 2044103311 | 0 | 4 |
| 96 | 4143212122 | 1 | 3 |
| 97 | 3341424244 | 1 | 7 |
| 98 | 2233404043 | 0 | 6 |
| 99 | 0022313141 | 1 | 3 |
| 100 | 0100131332 | 1 | 3 |
| 101 | 0200313214 | 1 | 3 |
| 102 | 0401131433 | 1 | 5 |
| 103 | 1302313421 | 0 | 4 |
| 104 | 3110152342 | 0 | 4 |
| 105 | 1220320234 | 1 | 3 |
| 106 | 2441141023 | 0 | 4 |
| 107 | 0423332101 | 0 | 4 |
| 108 | 1420214202 | 0 | 2 |
| 109 | 3340433404 | 0 | 8 |
| 110 | 2231422313 | 0 | 4 |
| 111 | 0013400131 | 1 | 3 |
| 112 | 0032300312 | 1 | 3 |
| 113 | 0120101124 | 1 | 1 |
| 114 | 0240202303 | 1 | 3 |
| 115 | 1030410111 | 0 | 2 |
| 116 | 2111320222 | 1 | 1 |
| 117 | 4223140444 | 0 | 6 |
| 118 | 4001331443 | 0 | 6 |
| 119 | 3003213441 | 1 | 5 |
| 120 | 1011432432 | 0 | 4 |
| 121 | 2023420414 | 0 | 4 |
| 122 | 4102341333 | 0 | 6 |
| 123 | 3210233221 | 1 | 3 |
| 124 | 1421021442 | 1 | 3 |
| 125 | 3342043434 | 0 | 8 |
| 126 | 2234142423 | 1 | 5 |
| 127 | 0023340401 | 0 | 4 |
| 128 | 0102231302 | 0 | 2 |
| 129 | 0210013104 | 0 | 2 |
| 130 | 0420031213 | 1 | 3 |
| 131 | 1340112431 | 0 | 4 |
| 132 | 3230230412 | 0 | 4 |
| 133 | 2011011324 | 0 | 2 |
| 134 | 4022023203 | 1 | 3 |
| 135 | 2044101411 | 0 | 4 |
| 136 | 1143203322 | 0 | 4 |
| 137 | 2341412144 | 1 | 5 |
| 138 | 0233324343 | 1 | 7 |
| 139 | 1022204241 | 0 | 2 |
| 140 | 2044414032 | 1 | 5 |
| 141 | 4144333114 | 1 | 7 |
| 142 | 3344221233 | 0 | 6 |
| 143 | 2243443021 | 1 | 5 |
| 144 | 0042441042 | 0 | 4 |
| 145 | 0140432134 | 1 | 5 |
| 146 | 0331414323 | 0 | 6 |
| 147 | 1213334201 | 0 | 4 |
| 148 | 2432223402 | 0 | 4 |
| 149 | 0420002304 | 1 | 3 |
| 150 | 1340010113 | 1 | 3 |

| h | $2^{P}_{M}$ | f(p) | K |
|---|---|---|---|
| 151 | 3230020231 | 1 | 3 |
| 152 | 2010041012 | 1 | 1 |
| 153 | 4020132024 | 1 | 3 |
| 154 | 3040314103 | 1 | 5 |
| 155 | 1131133211 | 1 | 3 |
| 156 | 2312321422 | 1 | 3 |
| 157 | 0130143344 | 0 | 6 |
| 158 | 0310342243 | 1 | 5 |
| 159 | 1121240041 | 0 | 2 |
| 160 | 2243030132 | 0 | 4 |
| 161 | 0041110314 | 1 | 3 |
| 162 | 0132221133 | 1 | 3 |
| 163 | 0314442321 | 1 | 5 |
| 164 | 1134440142 | 1 | 5 |
| 165 | 2324430334 | 1 | 7 |
| 166 | 0204411223 | 1 | 3 |
| 167 | 0414323001 | 0 | 4 |
| 168 | 1334201002 | 1 | 3 |
| 169 | 3223402004 | 0 | 4 |
| 170 | 2002304013 | 1 | 3 |
| 171 | 4010113031 | 1 | 3 |
| 172 | 3020231112 | 0 | 2 |
| 173 | 1041012224 | 0 | 2 |
| 174 | 2132030003 | 1 | 3 |
| 175 | 4314110011 | 1 | 3 |
| 176 | 4133220022 | 1 | 3 |
| 177 | 3321440044 | 0 | 6 |
| 178 | 2143430143 | 0 | 6 |
| 179 | 4342410341 | 0 | 6 |
| 180 | 4240321232 | 0 | 4 |
| 181 | 4031143014 | 1 | 5 |
| 182 | 3112341033 | 1 | 5 |
| 183 | 1230232121 | 0 | 2 |
| 184 | 3011014242 | 1 | 3 |
| 185 | 1022034034 | 0 | 4 |
| 186 | 2044123125 | 0 | 4 |
| 187 | 4143301301 | 1 | 5 |
| 188 | 3342103102 | 0 | 4 |
| 189 | 2234211204 | 1 | 3 |
| 190 | 0023422413 | 0 | 4 |
| 191 | 0102400331 | 1 | 3 |
| 192 | 0210301212 | 1 | 1 |
| 193 | 0421102424 | 1 | 3 |
| 194 | 1342210403 | 0 | 4 |
| 195 | 3234421311 | 1 | 5 |
| 196 | 2024343122 | 0 | 4 |
| 197 | 4104241244 | 1 | 5 |
| 198 | 3214033043 | 0 | 6 |
| 199 | 1432121141 | 0 | 6 |
| 200 | 3421242332 | 1 | 5 |
| 201 | 2343040214 | 1 | 5 |
| 202 | 0241130433 | 1 | 5 |
| 203 | 1032311421 | 1 | 3 |
| 204 | 2120123342 | 1 | 3 |
| 205 | 4240302234 | 1 | 5 |
| 206 | 4031110023 | 1 | 3 |
| 207 | 3112220101 | 1 | 1 |
| 208 | 1224440202 | 1 | 3 |
| 209 | 3004430404 | 0 | 6 |
| 210 | 1014411313 | 0 | 4 |
| 211 | 2034323131 | 1 | 5 |
| 212 | 4124201312 | 1 | 3 |
| 213 | 3303403124 | 0 | 6 |
| 214 | 2112311303 | 1 | 3 |
| 215 | 4230123111 | 1 | 3 |
| 216 | 2010301222 | 0 | 2 |
| 217 | 3021102444 | 0 | 4 |
| 218 | 0142210443 | 0 | 4 |
| 219 | 2134421441 | 1 | 5 |
| 220 | 4324342232 | 0 | 8 |
| 221 | 4204242414 | 1 | 5 |
| 222 | 3414040333 | 1 | 7 |
| 223 | 2333131221 | 0 | 4 |
| 224 | 0221312442 | 1 | 3 |
| 225 | 0443130434 | 1 | 7 |
| 226 | 1441311423 | 1 | 5 |
| 227 | 3433123401 | 0 | 6 |
| 228 | 2421302302 | 1 | 3 |
| 229 | 0343110104 | 0 | 4 |
| 230 | 1241220213 | 0 | 2 |
| 231 | 3032440431 | 0 | 6 |

| h | $2^{P}_{M}$ | f(p) | K |
|---|---|---|---|
| 232 | 1120431412 | 1 | 3 |
| 233 | 2241413324 | 1 | 5 |
| 234 | 0033332203 | 1 | 5 |
| 235 | 0122214411 | 0 | 2 |
| 236 | 0244434322 | 0 | 6 |
| 237 | 1044424144 | 0 | 6 |
| 238 | 2144403343 | 1 | 7 |
| 239 | 4344312241 | 0 | 6 |
| 240 | 4244130032 | 1 | 5 |
| 241 | 4043310114 | 1 | 5 |
| 242 | 3142120233 | 0 | 4 |
| 243 | 1334241021 | 0 | 4 |
| 244 | 3224032042 | 0 | 4 |
| 245 | 2003114134 | 0 | 4 |
| 246 | 4011233323 | 1 | 5 |
| 247 | 3023022201 | 0 | 2 |
| 248 | 1101044402 | 1 | 3 |
| 249 | 2202144304 | 0 | 4 |
| 250 | 4404344113 | 1 | 7 |
| 251 | 4314243231 | 0 | 6 |
| 252 | 4134042012 | 0 | 4 |
| 253 | 3323134024 | 0 | 6 |
| 254 | 2201323103 | 1 | 3 |
| 255 | 4403201211 | 1 | 3 |
| 256 | 4311402422 | 0 | 4 |
| 257 | 4123310344 | 0 | 6 |
| 258 | 3302121243 | 0 | 4 |
| 259 | 2104243041 | 0 | 4 |
| 260 | 4214041132 | 0 | 4 |
| 261 | 3433132314 | 1 | 7 |
| 262 | 2421320133 | 0 | 4 |
| 263 | 0343140321 | 1 | 5 |
| 264 | 1241331142 | 0 | 4 |
| 265 | 3033212334 | 0 | 6 |
| 266 | 1121430223 | 1 | 3 |
| 267 | 2243411001 | 1 | 3 |
| 268 | 0042322002 | 0 | 2 |
| 269 | 0140144004 | 0 | 4 |
| 270 | 0330343013 | 0 | 6 |
| 271 | 1211241031 | 0 | 2 |
| 272 | 2423032112 | 1 | 3 |
| 273 | 0401114224 | 1 | 3 |
| 274 | 1302234003 | 0 | 4 |
| 275 | 3110023011 | 0 | 2 |
| 276 | 1220101022 | 0 | 0 |
| 277 | 2440202044 | 0 | 4 |
| 278 | 0430404143 | 0 | 6 |
| 279 | 1411313341 | 1 | 5 |
| 280 | 3323132232 | 1 | 5 |
| 281 | 2201320014 | 0 | 2 |
| 282 | 4403140033 | 0 | 4 |
| 283 | 4311330121 | 0 | 4 |
| 284 | 4123210242 | 1 | 3 |
| 285 | 3301421034 | 1 | 5 |
| 286 | 2103342123 | 0 | 4 |
| 287 | 4212234301 | 0 | 4 |
| 288 | 3430024102 | 0 | 4 |
| 289 | 2410103204 | 1 | 3 |
| 290 | 0320211413 | 1 | 3 |
| 291 | 1140423331 | 1 | 5 |
| 292 | 2331402212 | 1 | 3 |
| 293 | 0213304424 | 1 | 5 |
| 294 | 0432114403 | 1 | 5 |
| 295 | 1414234311 | 1 | 5 |
| 296 | 3334024122 | 1 | 5 |
| 297 | 2223103244 | 0 | 4 |
| 298 | 0001212043 | 0 | 2 |
| 299 | 0002424141 | 1 | 3 |
| 300 | 0010403332 | 0 | 4 |
| 301 | 0021312214 | 0 | 2 |
| 302 | 0043124433 | 0 | 6 |
| 303 | 0141304421 | 0 | 4 |
| 304 | 0333114342 | 0 | 6 |
| 305 | 1221234234 | 0 | 4 |
| 306 | 2443024023 | 1 | 5 |
| 307 | 0441103101 | 1 | 3 |
| 308 | 1432211202 | 0 | 2 |
| 309 | 3414422404 | 0 | 5 |
| 310 | 2334400313 | 0 | 6 |
| 311 | 0224301134 | 1 | 3 |
| 312 | 1004102312 | 0 | 2 |

| h | $2^p$ M | f(p) | K |
|---|---|---|---|
| 313 | 2013210124 | 0 | 2 |
| 314 | 4031420303 | 1 | 5 |
| 315 | 3113341111 | 0 | 4 |
| 316 | 1232232222 | 0 | 2 |
| 317 | 3020214444 | 1 | 5 |
| 318 | 1040034443 | 0 | 6 |
| 319 | 2130124441 | 0 | 4 |
| 320 | 4310304432 | 0 | 6 |
| 321 | 4121114414 | 0 | 4 |
| 322 | 3242234333 | 1 | 7 |
| 323 | 2040024221 | 0 | 2 |
| 324 | 4130103442 | 1 | 5 |
| 325 | 3310212434 | 1 | 5 |
| 326 | 2120430423 | 0 | 4 |
| 327 | 4241411401 | 0 | 4 |
| 328 | 4033323302 | 0 | 6 |
| 329 | 3122202104 | 0 | 2 |
| 330 | 1244404213 | 1 | 5 |
| 331 | 3044313431 | 1 | 7 |
| 332 | 1144132412 | 0 | 4 |
| 333 | 2343320324 | 0 | 6 |
| 334 | 0242141203 | 1 | 3 |
| 335 | 1034332411 | 1 | 5 |
| 336 | 2124220322 | 0 | 2 |
| 337 | 4303441144 | 1 | 7 |
| 338 | 4112432343 | 0 | 6 |
| 339 | 3230420241 | 0 | 4 |
| 340 | 2011341032 | 1 | 3 |
| 341 | 4023232114 | 0 | 4 |
| 342 | 3102014233 | 0 | 4 |
| 343 | 1204034021 | 1 | 3 |
| 344 | 2413123042 | 0 | 4 |
| 345 | 0331301134 | 1 | 5 |
| 346 | 1213102323 | 1 | 3 |
| 347 | 2431210201 | 0 | 2 |
| 348 | 0412420402 | 1 | 3 |
| 349 | 1330341304 | 0 | 6 |
| 350 | 3211233113 | 0 | 4 |
| 351 | 1423021231 | 1 | 3 |
| 352 | 3401043012 | 0 | 4 |
| 353 | 2302141024 | 1 | 3 |
| 354 | 0104332103 | 0 | 4 |
| 355 | 0214214211 | 0 | 2 |
| 356 | 0433433222 | 1 | 7 |
| 357 | 1422422344 | 1 | 5 |
| 358 | 3400400243 | 1 | 4 |
| 359 | 2301301041 | 1 | 3 |
| 360 | 0103102132 | 0 | 2 |
| 361 | 0211204314 | 1 | 3 |
| 362 | 0422414133 | 1 | 5 |
| 363 | 1400333321 | 1 | 5 |
| 364 | 3301222142 | 1 | 3 |
| 365 | 2102444334 | 0 | 6 |
| 366 | 4210444223 | 1 | 5 |
| 367 | 3421444001 | 1 | 5 |
| 368 | 2343443002 | 0 | 6 |
| 369 | 0242441004 | 0 | 4 |
| 370 | 1040432013 | 0 | 4 |
| 371 | 2131414031 | 0 | 4 |
| 372 | 4313333112 | 0 | 6 |
| 373 | 4132221224 | 1 | 3 |
| 374 | 3314443003 | 1 | 7 |
| 375 | 2134441011 | 0 | 4 |
| 376 | 4324432022 | 1 | 5 |
| 377 | 4204414044 | 0 | 6 |
| 378 | 3414333143 | 0 | 5 |
| 379 | 2334221341 | 1 | 5 |
| 380 | 0223443232 | 1 | 5 |
| 381 | 1002442014 | 1 | 3 |
| 382 | 2010434033 | 1 | 5 |
| 383 | 4021423121 | 1 | 3 |
| 384 | 3043401242 | 1 | 5 |
| 385 | 1142303034 | 1 | 5 |
| 386 | 2340111123 | 1 | 3 |
| 387 | 0230222301 | 0 | 2 |
| 388 | 1011000102 | 0 | 0 |
| 389 | 2022000204 | 1 | 1 |
| 390 | 4044000413 | 1 | 5 |
| 391 | 3143001331 | 1 | 5 |
| 392 | 1341003212 | 1 | 3 |
| 393 | 3232011424 | 0 | 4 |

| h | $2^p$ M | f(p) | K |
|---|---|---|---|
| 394 | 2014023403 | 0 | 4 |
| 395 | 4033102311 | 0 | 4 |
| 396 | 3121210122 | 1 | 1 |
| 397 | 1242420244 | 0 | 4 |
| 398 | 3040341033 | 0 | 6 |
| 399 | 1131232141 | 1 | 3 |
| 400 | 2313014332 | 1 | 5 |
| 401 | 0131034214 | 0 | 4 |
| 402 | 0312123433 | 1 | 5 |
| 403 | 1124302421 | 1 | 3 |
| 404 | 2304110342 | 0 | 4 |
| 405 | 0113221234 | 1 | 3 |
| 406 | 0231443023 | 1 | 5 |
| 407 | 1013441101 | 1 | 3 |
| 408 | 2032432202 | 1 | 3 |
| 409 | 4120414404 | 1 | 5 |
| 410 | 3241334313 | 1 | 7 |
| 411 | 2033224131 | 0 | 4 |
| 412 | 4122003312 | 1 | 3 |
| 413 | 3244012124 | 0 | 4 |
| 414 | 2043024303 | 1 | 5 |
| 415 | 4141104111 | 1 | 3 |
| 416 | 3232213222 | 0 | 4 |
| 417 | 2214431444 | 0 | 6 |
| 418 | 4434413443 | 1 | 9 |
| 419 | 4424332441 | 1 | 7 |
| 420 | 4404220432 | 1 | 5 |
| 421 | 4313441414 | 1 | 7 |
| 422 | 4132433333 | 0 | 8 |
| 423 | 3320422221 | 1 | 3 |
| 424 | 2141344442 | 0 | 6 |
| 425 | 4333244434 | 1 | 9 |
| 426 | 4222044423 | 1 | 5 |
| 427 | 3444144401 | 1 | 7 |
| 428 | 2443344302 | 1 | 7 |
| 429 | 0442244104 | 1 | 5 |
| 430 | 1440043213 | 1 | 5 |
| 431 | 3430141431 | 0 | 6 |
| 432 | 2410333412 | 1 | 5 |
| 433 | 0321222324 | 1 | 3 |
| 434 | 1143000203 | 1 | 3 |
| 435 | 2341000411 | 1 | 3 |
| 436 | 0232001322 | 0 | 2 |
| 437 | 1014003144 | 0 | 4 |
| 438 | 2033011343 | 1 | 5 |
| 439 | 4121023241 | 1 | 3 |
| 440 | 3242102032 | 1 | 3 |
| 441 | 2034204114 | 0 | 4 |
| 442 | 4123413233 | 0 | 6 |
| 443 | 3302332021 | 0 | 4 |
| 444 | 2110214042 | 0 | 2 |
| 445 | 4220433124 | 0 | 6 |
| 446 | 3441421323 | 0 | 6 |
| 447 | 2433343201 | 0 | 6 |
| 448 | 0422241402 | 1 | 3 |
| 449 | 1400033304 | 1 | 5 |
| 450 | 3300122113 | 1 | 3 |
| 451 | 2100244231 | 1 | 3 |
| 452 | 4201044012 | 1 | 3 |
| 453 | 3402143024 | 1 | 5 |
| 454 | 2304341103 | 1 | 5 |
| 455 | 0114232211 | 0 | 2 |
| 456 | 0234014422 | 0 | 4 |
| 457 | 1023034344 | 0 | 6 |
| 458 | 2101124243 | 1 | 3 |
| 459 | 4202304041 | 0 | 4 |
| 460 | 3410113132 | 0 | 4 |
| 461 | 2320231314 | 0 | 4 |
| 462 | 0141013133 | 0 | 4 |
| 463 | 0332031321 | 0 | 4 |
| 464 | 1214113142 | 1 | 3 |
| 465 | 2433231334 | 1 | 7 |
| 466 | 0422013223 | 1 | 3 |
| 467 | 1344032001 | 0 | 4 |
| 468 | 3243114002 | 0 | 4 |
| 469 | 2041233004 | 0 | 4 |
| 470 | 4133021013 | 0 | 4 |
| 471 | 3321042031 | 0 | 4 |
| 472 | 2142134112 | 1 | 3 |
| 473 | 4334323224 | 1 | 7 |
| 474 | 4224202003 | 1 | 3 |

| h | $2^p_M$ | f(p) | K |
|---|---|---|---|
| 475 | 4003404011 | 0 | 4 |
| 476 | 3012313022 | 1 | 3 |
| 477 | 1030131044 | 0 | 4 |
| 478 | 2110312143 | 1 | 3 |
| 479 | 4221124341 | 0 | 4 |

While the value of $n$ used in this example is too small for cryptographic practice, it is large enough to illustrate the application of this invention.

The pseudo-random digit sequence provided by this invention is sufficient to make decipherment during any useful time period virtually impossible. Nevertheless, certain techniques may be employed to make the probability of decipherment even smaller. The additional devices to be employed are primarily circuital in character and employ trigger pairs controlled by puller functions and delay lines to alter the character of the digit sequence, $f(p)$. Since the number of such devices is practically unlimited, their use will be illustrated by examples.

When $m=5$, $r=2$, and $n=10$, as in Table III, let $$x_9(d)=0, 0, 0, 1, 0$$
$$y_9(d)=0, 0, 1, 0, 0$$

when $$d=0, 1, 2, 3, 4$$

be transforms applied to the highest order digits of $z_p$. Further let $$x_0(d)=0, 0, 0, 1$$
$$y_0(d)=1, 0, 0, 0$$

when $$d=1, 2, 3, 4$$

be transforms applied to the lowest order digit of $z_p$. Then the puller function $$P_0=x_9x_0$$

and $$P_1=y_9y_0$$

can be used to control a trigger pair which can in turn be employed to alter the character of $f(p)$.

Note that the puller functions can take on the pairs of values, $$P_0,P_1=0, 0; 0, 1; 1, 0.$$

They cannot, however, assume the pair of values $$P_0,P_1 \neq 1, 1.$$

Hence, when the trigger pair is pulled into its 0 position it will remain there until the highest order digit of some subsequent value of $z_p$ contains a 2 digit at the same time the lowest order digit is a 1. The trigger will then be pulled into its 1 position where it will remain until some value of $z_p$ provides a highest order digit 3 and a lowest order digit 4 at which time the trigger will return to its 0 position again.

Figure 3:
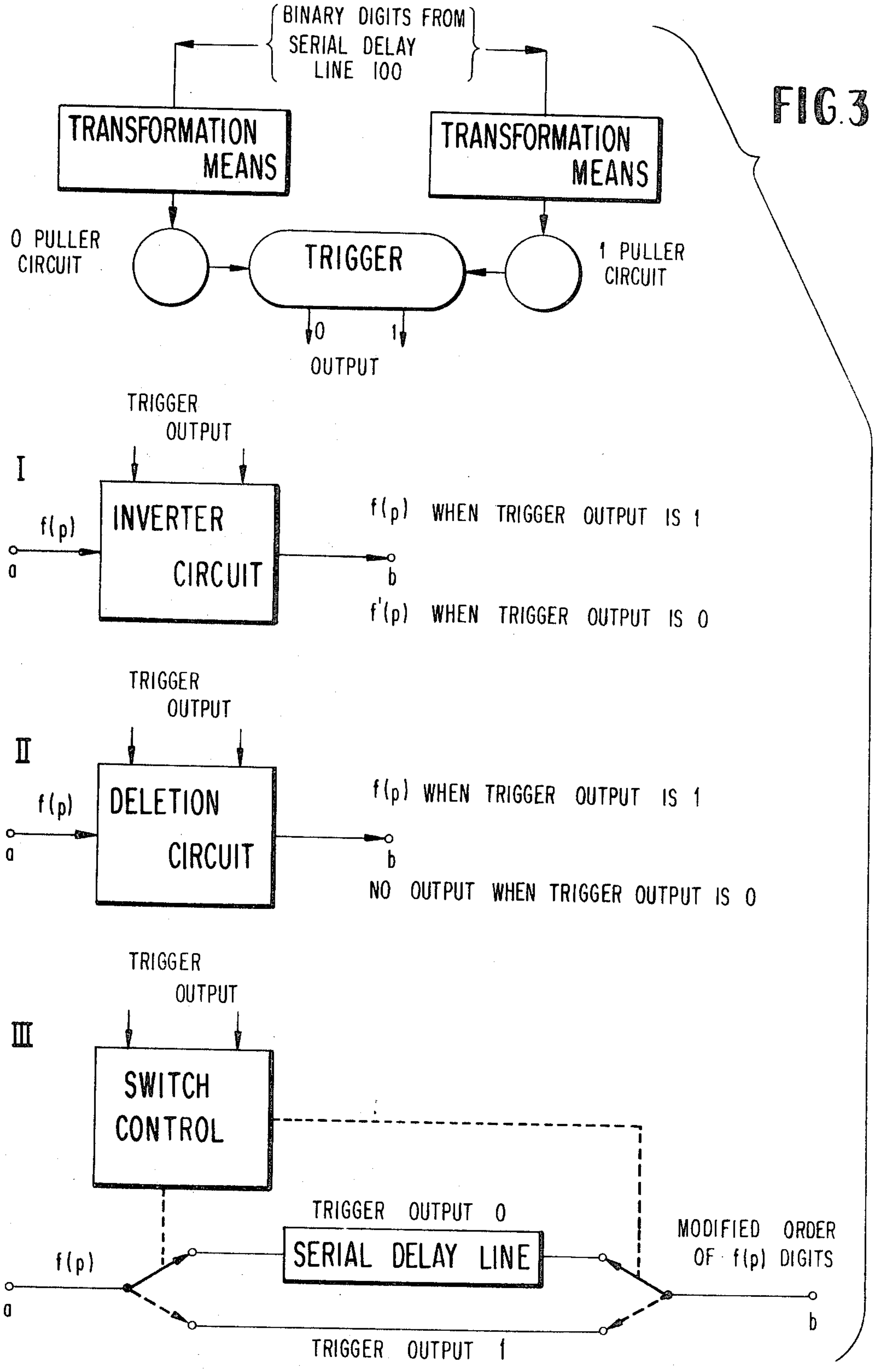
FIG. 3 is block diagrams of circuits for modifying a sequence of pseudo-random digits.

The block diagrams of FIG. 3 represent circuitry for altering the character of the digit sequence $f(p)$ in accordance with the puller functions $P_0$, $P_1$. In the general case the puller functions may be dependent upon any or all of the digits of $z_p$. Since these digits are serially available at the output of the delay line 100, it will be recognized that the transformation means shown in FIG. 3 include storage elements to insure the simultaneous availability of the digits.

The two states of the trigger pair controlled by the 0 and 1 puller circuits can be used as illustrated in FIG. 3 to:

I. Complement or not complement the digits of $f(p)$ according to trigger state, see FIG. 3I, II. Delete or not delete the digits of $f(p)$ according to the trigger state, see FIG. 3 II, III. Open or close the gates at the input and output of a delay line so that blocks of digits can be deleted from or inserted into the digit stream according to the trigger state, see FIG. 3 III.

Needless to say, circuits can be controlled by two or more triggers, and the control of the triggers can be vested in the variables $x_1, x_2, \ldots x_n; y_1, y_2, \ldots y_n$, or in still other triggers. Indeed with 20 inputs and 20 internal triggers, circuits can be made so complicated that an observer who sees only the inputs and outputs can hardly be expected to deduce the wiring diagram in a single lifetime.

From the foregoing, it can be seen that this invention provides a relatively low cost, small size, low power consumption and highly reliable digit generator for cryptographic applications to provide pseudo-random numbers of extremely long periodicy. The apparatus built with components using integrated circuit techniques is not much larger than a package of cigarettes excluding read in and read out equipment. It is of a size and cost sufficient to enable it to be economically incorporated in typewriters or tape machines for encoding and decoding purposes.

What is claimed is:

1. A cryptographic method of the type using pseudo-random digits to encode and decode data, comprising:

a. means for generating a sequence of powers $|r^p|_M$ where $M=m^n$, $m$ is a prime and $r$ is a primitive root of $m$, so chosen that the number of distinct powers is $N=(m-1)m^{(n-1)}$, b. transforming the digits of the powers $|r^p|_M$ obtained in step (a) into Boolean vectors, c. entering the Boolean vectors as arguments of Boolean functions to generate pseudo-random digits of radix-$r$.

2. A method as in claim 1 wherein $r=2$ and the Boolean vectors are partitioned into two subsets each having $2^{n-1}$ vectors and each having an equal number of vector occurrences en toto as the powers $|r^p|_M$ are generated in the interval $0 \leq p < N$ thus providing binary pseudo-random digits having substantially an equal number of 0's and 1's.

3. A method as in claim 2 wherein the Boolean vectors are partitioned in accordance with the following,

| | |
|---|---|
| 0..0000 | **0..0001** |
| 0..0011 | **0..0010** |
| 0..0101 | **0..0100** |
| 0..0110 | **0..0111** |
| 0..1001 | **0.1000** |
| 0..1010 | **0..1011** |
| .... | .... |

so that the Boolean function defining the pseudo-random digits may be implemented by a mod-2 adder.

4. A method as in claim 1 wherein $r=3$, $m=7$.

5. A cryptographic method using pseudo-random digits derived from $N=(m-1)m^{n-1}$ distinct powers of $|r^p|_M$ where $M=m^n$, $m$ is a prime, and $r$ is a primitive root of $m$, the pseudo-random digits being obtained by a. generating the powers of $r$ modulo M by the recurrence relationship $|r^{p+1}|M=|r \cdot r^p|_M$, b. transforming the digits of $|r^p|_M$ into Boolean vectors by means of the transformation $T(d) = \delta_0$, 67$_1$, $\ldots \delta_{m-1}$ where the δ's are all 0's or 1's so that $2^m$ such transformations exist, c. entering the Boolean vectors into Boolean functions to generate pseudo-random digits of radix-$r$.

6. A cryptographic method as in claim 5 wherein $r=2$, for the generation of radix-2 pseudo-random digits.

7. A cryptographic method as in claim 5 wherein $r=3$ and $m=7$ for the generation of radix-3 pseudo-random digits.

8. A cryptographic method as defined in claim 5 further comprising additional encrypting means to modify the order of the pseudo-random digits.

9. A cryptographic system including a method of generating pseudo-random digits of extremely great periodicy comprising;

a. generating the powers of $|r^p|_M$ where $M=m^n$, $m$= prime number, $r$= primitive root of $m$, and $r$ is chosen such that the number of distinct powers of $r$ modulo M is $N=(m-1)m^{(n-1ah)}$ b. applying the transformation $T(dpq)$ to the digits of $|r^p|_M$ to form Boolean vectors having all digits 0 and 1, c. using the results of (b) as arguments of a Boolean function $f(p)$ to produce pseudo-random binary digits.

10. Apparatus for generating pseudo-random digits used in a cryptographic system, the apparatus comprising a serial delay line with means for entering the cryptographic key number $|r^p0|_M$ where $m$ is a prime, and $r$ is a primitive root of $m$ so chosen that the number of distinct powers of $r$ modulo-M is $N=(m-1)m^{n-1}$, a multiply by $r$ means in a recirculation circuit of the delay line to produce the powers $|r^p|_M$successively beginning with $|r^p0|_M$ the key, means for transforming the output of the delay line into Boolean vectors, means for entering the Boolean vectors as arguments of Boolean functions to generate pseudo-random digits, and means for combining the pseudo-random digits with a message for encrypting or decrypting the same.

11. Apparatus as in claim 10 further comprising additional encrypting means in combination to modify the order of pseudo-random digits.

12. Apparatus as in claim 11 wherein the additional encrypting means includes trigger pairs controlled by puller functions, interruption means, and delay line.

13. Apparatus as in claim 12 wherein the two states of the trigger pairs are used to complement or not complement the digits of $f(p)$ according to trigger state; delete or not delete the digits of $f(p)$ according to the trigger state; open or close the gates at the input and output of a delay line so that blocks of digits can be deleted from or inserted into the digit stream according to the trigger state.

14. A cryptographic apparatus comprising; a serial delay line, means for manually entering a crytographic key in the serial delay line representing $|r^p0|_M$ where $M=m^n$, $m=5$ $r=2$, a multiply by 2 circuit connected to the output of the delay line, and having one output connected to the input of the delay line, an output of the multiply by 2 circuit to provide carry digits, a mode 2 adder connected to the times 2 circuit to receive the carry digits and produce binary pseudo-random digits $f(p)$, the output of the mode 2 adder connected to another mod 2 adder for combining with a clear or encrypted message to provide an encrypted or clear message respectively.

15. A cryptographic method for encrypting the letters of the alphabet comprising; regarding the alphabet letters as integers of a radix 27 number system represented by three ternary digits, and operating upon the ternary digits in accordance with the rules of ternary arithmetic.

16. A method as in claim 15 wherein the alphabet letters are regarded as the following triples of ternary digits in the radix 27 number system:

| | | | | | |
|---|---|---|---|---|---|
| • | 000 | I | 100 | R | 200 |
| A | 001 | J | 101 | S | 201 |
| B | 002 | K | 102 | T | 202 |
| C | 010 | L | 110 | U | 210 |
| D | 011 | M | 111 | V | 211 |
| E | 012 | N | 112 | W | 212 |
| F | 020 | O | 120 | X | 220 |
| G | 021 | P | 121 | Y | 221 |
| H | 022 | Q | 122 | Z | 222 |

17. A method of generating a sequence of pseudo-random digits $$f(p)=\left|\sum_{q=0}^{n-1}\left[\frac{rd_{pq}}{m}\right]\right|_r$$

by utilizing the carry digits arising in the formation of $|r^{p+1}|_M$ by multiplication of $|r^p|_M$ by $r$ modulo M where $m$ is a prime $M=m^n$, $r$ is a primitive root of $m$ so chosen that $N=(m-1)m^{n-1}$ and that $(m-1)/r=$ an integer.

18. A method of generating a sequence of binary digits based upon Boolean vectors obtained from transforms of the digits in the powers $|2^p|_M$ where $m$ is a prime, $M=m^n$, $r=2$ is a primitive root of $m$ and $m$ is so chosen that the number of distinct power is $N=(m-1)m^{n-1}$ and the transform is defined by $$T(dpq)=\left[\frac{2d_{pq}}{m}\right]$$

and thus made identical with the carry digits generated by multiplying $|2^p|_M$ by 2 modulo M to form $$|2^{p+1}|_m.$$

19. A method of generating a sequence of pseudo-random binary digits $$f(p)=\left|\sum_{q=0}^{n-1}\left[\frac{2d_{pq}}{m}\right]\right|_2$$

by utilizing the carry digits arising in the formation of $|2^{p+1}|_M$ by multiplication of $|2^p|_M$ by $r=2$ modulo M when $m$ is a prime being 2 as a primitive root and so chosen that $N=(m-1)m^{n-1}$.

20. A cryptographic system for encrypting the programs, input, and output of computers and data processing machines comprising:

a. generating the powers $|2^p|_M$ where $M=m^n$, $m$ is a prime having $r=2$ as a primitive root, and $m$ is so chosen that the number of distinct powers of 2 modulo M is $N=(m-1)m^{n-AH1}$ b. applying the transformation $T(dpq)$ to digits of $|2^p|_M$ to form Boolean vectors having all digits 0 or 1, c. partitioning the Boolean vectors into two subsets such that each subset has an equal number of vectors and an equal number of vector occurrences in the range $0 \leq p < N$, d. using one of the subsets to define a Boolean function to produce pseudo-random binary digits, e. combining the pseudo-random digits with the digits representing program input data, and output data for purposes of encoding and decoding.

21. A cryptographic system for encrypting the programs, input, and output of computers and data processing machines comprising:

a. generating a sequence of pseudo-random digits of great period, and b. combining the pseudo-random digits with digits representing program input data, and output data for purposes of encoding and decoding.

* * * * *

PO-1050 (5/69)

UNITED STATES PATENT OFFICE
CERTIFICATE OF CORRECTION

Patent No. 3,657,476 Dated April 18, 1972

Inventor(s) Howard H. AIKEN

It is certified that error appears in the above-identified patent and that said Letters Patent are hereby corrected as shown below:

Column 3, line 63, should be changed from " $a\mu - 1_b\delta(a - 1)$" to read -- $a^{\mu-1}b^{\nu}(a - 1)$--.

Column 3, line 67, should be changed from " $a\mu b\delta$" to read -- $a^{\mu}b^{\nu}$--.

Column 3, line 70, should be changed from "$\Phi=0$" to read --$\varphi=0$--.

Column 4, line 3, should be changed from "$\Phi$" to read --$\varphi$--.

Column 4, line 23, should be changed from "$\Phi$" to read --$\varphi$--.

Column 16, line 49, should be changed from "$T(d) = \delta_0, 67_1 . . . \delta_{m-i}$" to read --$T(d) = \delta_0, \delta_1 . . . \delta_{m-1}$--.

Column 16, lines 67 and 68, should be changed from "M is $N=(m-1)m^{(n-1ah)}$" to read --M is $N=(m-1)m^{(n-1)}$--.

Column 16, line 75, should be changed from "$\lfloor r^{P}0|_M$" to read --$|r^{P_0}|_M$--.

Column 17, line 3, should be changed from "$\lfloor r^{P}0|_M$" to read --$|r^{P_0}|_M$--.

Column 17, line 14, should be changed from "and delay line" to read --and a delay line--.

Column 17, line 24, should be changed from "$|r^{P}0|M$" to read --$|r^{P_0}|_M$--.

Column 17, line 30, should be changed from "mode 2" to read --mod 2--.

Column 18, lines 38 and 39, should be changed from "M is $N=(m-1)m^{n-AH1}$" to read --M is $N= (m-1)m^{n-1}$--.

Signed and sealed this 9th day of January 1973.

(SEAL)
Attest:

EDWARD M. FLETCHER, JR.
Attesting Officer

ROBERT GOTTSCHALK
Commissioner of Patents